United States Patent [19]

Hayashi et al.

[11] 4,394,995
[45] Jul. 26, 1983

[54] REEL-TURNTABLE TORQUE ADJUSTING MEANS

[75] Inventors: Hideki Hayashi; Kazuki Takai, both of Toda, Japan

[73] Assignee: Clarion Co., Ltd., Tokyo, Japan

[21] Appl. No.: 246,702

[22] Filed: Mar. 23, 1981

[30] Foreign Application Priority Data

Mar. 21, 1980 [JP] Japan ............................ 55-37610[U]

[51] Int. Cl.$^3$ ........................ G03B 1/04; G11B 15/32; B65H 17/02
[52] U.S. Cl. ................................... 242/207; 242/68.1
[58] Field of Search ........................ 242/68.1, 200–204, 242/207; 74/411, 461; 64/11, 14, 15 R, 23, 27 L

[56] References Cited

U.S. PATENT DOCUMENTS

| 3,373,950 | 3/1968 | Greenberg | 242/200 |
| 3,640,483 | 2/1972 | Beck et al. | 242/195 X |
| 3,768,753 | 10/1973 | Catto et al. | 242/197 |

*Primary Examiner*—Leonard D. Christian
*Attorney, Agent, or Firm*—Wallenstein, Wagner, Hattis, Strampel & Aubel

[57] ABSTRACT

A reel-turntable torque adjusting means comprising a series of steps (3) having different heights formed on an upper peripheral portion of a reel-turntable pulley (1) coupled to a reel turntable (4) for conveying a rotational force thereto and a spring (2) having fingers pressed at respective tip ends (20) thereof against the steps (3) whereby the pulley is pressed against a friction plate (5) driven by a motor, which is characterized in that each finger of the spring has slanting portions (21) at its tip end portion.

2 Claims, 9 Drawing Figures

REEL-TURNTABLE TORQUE ADJUSTING MEANS

BACKGROUND OF THE INVENTION

1. Field of the Invention

This invention relates to a reel-turntable torque adjusting means for use in a tape recorder etc.

2. Description of the Prior Art

In a tape recorder etc., to synchronize a tape feeding speed with a rotation speed of a reel, a reel turntable mechanism is generally provided with a clutch means comprised of a friction plate and a reel-turntable pulley for adjusting a torque of the clutch means to attain the desired synchronization. In this case, the friction plate and the reel-turntable pulley are pressed against each other through a felt pad by a resilient means such as a spring, to provide appropriate slip for obtaining a desired torque. However, it is, in fact, difficult to obtain the desired torque due to variances in frictional force of the friction plate, load of the spring, etc. Therefore, there has been proposed a means wherein the load of the spring may be varied for obtaining a desired torque.

FIG. 1 illustrates one form of conventional adjusting means as described above. 1 is a reel-turntable pulley and 2 is a spring. As illustrated in FIG. 8, the reel-turntable pulley 1 is coupled to a reel turntable 4, on which a magnetic tape cassette is mounted, to convey a rotational force to the reel turntable 4. The spring 2 is a leaf spring having one or more radial extending fingers whose tip end portions 20 press steps 3 formed on a top peripheral portion of the pulley 1 thereby to press the pulley 1 against a motor-driven friction plate 5 as illustrated in FIG. 9 in connection with another form of conventional adjusting means. The steps 3 have base portions of different heights, respectively, and the spring 2 is adapted to be engaged with the steps 3 of different heights to vary the pressure of the spring 2 against the pulley 1. A stopper 31 is provided, for at least one finger of the spring 2, at a boundary portion or portions of the respective adjacent steps 3, to prevent the tip end portion 20 of the finger 2 from slipping down from the step 3 on which the finger is located. However, in this conventional adjusting means, the tip end portion 20 of the spring 2 is formed flat and the shoulder portions of the steps 3 or the stoppers 31 have vertical walls, respectively, so that when it is required to move the tip end portions 20 of the spring 2 to other steps 3, respectively, by rotating the spring 2 clockwise or counterclockwise, the spring 2 encounters a difficulty or resistance in passing over the shoulder portions and/or the stoppers 31. In especial, the spring is subject to large resistance at a time when the spring rises onto the shoulder or the stopper. As a result, undesired large force is applied to the spring 2 to possibly cause yield in the spring 2.

SUMMARY OF THE INVENTION

It is therefore an object of the present invention to provide a reel-turntable torque adjusting means which is capable of obviating the disadvantage of the conventional adjusting means.

It is another, more specific object of the present invention to provide a reel-turntable torque adjusting means which is capable of facilitating movement of the spring to easily and smoothly effect the desired torque adjustment.

In accordance with the present invention, there is provided a reel-turntable torque adjusting means which comprises:

a reel turntable;

a reel-turntable pulley for conveying a rotational force to said reel turntable;

said reel-turntable pulley being formed with a plurality of steps having different heights at an upper peripheral portion thereof;

a spring member having one or more tip ends pressed against the steps, respectively;

said spring member having slanting portions on opposite sides of each of said tip ends; and a motor-driven friction plate against which said reel-turntable pulley is pressed by said spring member.

DESCRIPTION OF THE EMBODIMENT

Referring now to FIGS. 4 to 7, there is illustrated one embodiment of the present invention.

Figure 1:
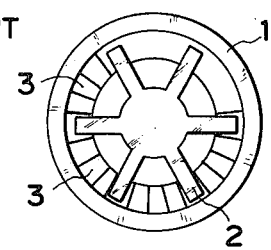
FIG. 1 is a plan view of one form of conventional reel-turntable torque adjusting means.
Figure 2:
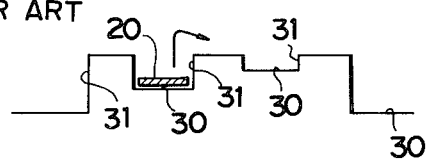
FIG. 2 is a diagrammatic view for explaining formation of steps of the means illustrated in FIG. 1.
Figure 3:
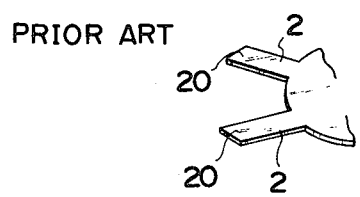
FIG. 3 is a perspective view of tip end portions of a spring employed in the means illustrated in FIG. 1.
Figure 4:
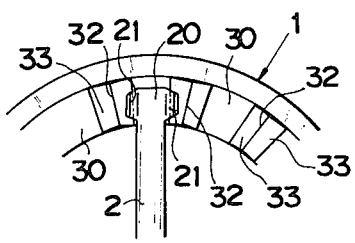
FIG. 4 is a fragmentary plan view of one embodiment of a reel-turntable torque adjusting means according to the present invention.
Figure 5:
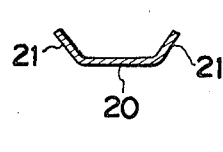
FIG. 5 is a sectional view of a tip end portion of a spring employed in the means illustrated in FIG. 4.
Figure 6:
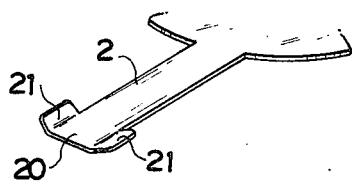
FIG. 6 is a perspective view of the tip end portion of the spring.
Figure 7:
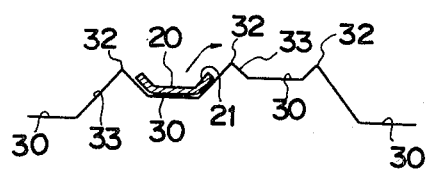
FIG. 7 is a diagrammatic view for explaining formation of steps of the means illustrated in FIG. 4.
Figure 8:
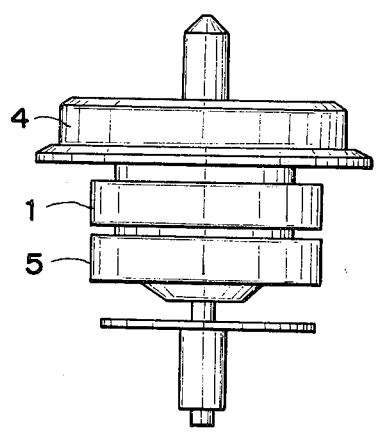
FIG. 8 is a schematic view of clutch portion of a conventional adjusting means.
Figure 9:
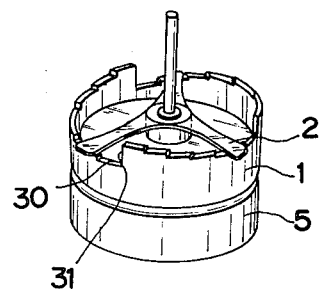
FIG. 9 is a perspective view of another form of conventional reel-turntable torque adjusting means.

FIG. 4 is a fragmentary plan view of a reel-turntable torque adjusting means according to the present invention. Arcuate projections 21 are provided on side portions of a tip end portion 20 or portions 20 of a spring 2. The projections 21 are directed upwardly to provide slanting side portions, respectively. This slanting side portions may be formed by bending the respective sides of the spring upwardly, or alternatively by tapering side portions of a thick material employed for the spring 2. Step portions 3 have respective base portions 30 of different heights as in the conventional adjusting means, but, in the present embodiment, boundary portions (shoulder portions) between the steps 3 are formed in slopes. In the step having a stopper 32, slanting sidewalls 33 are formed so as to extend diagonally from the base portion 30 at the boundary portion. The slanting sidewalls 33 generally define the angled stopper 32. The slanting angle, curvature of the stopper 32 is not critical so long as the sidewalls 33 are so sloped as to allow the spring 2 to pass over easily. The boundary portion may be formed in a smooth curved convex.

In the adjusting means of the present invention as described above, when the spring 2 is rotated, the slanting side portion 21 of the spring 2 gradually climbs the slope 33 of the stopper 32 to move into the adjacent step 3. This enables easy movement of the tip end portions 20 of the spring 2 because there is no need to clear or climb over the vertical shoulders or stoppers as required in the conventional means.

As described above, according to the present invention, the spring has slanting portions on the sides thereof, so that the movement of the spring can be carried out smoothly to readily attain the desired adjustment of the pressure between the reel turntable pulley and the friction plate, i.e., adjustment of the reel-turntable torque. In addition, since the spring is not subject to significant resistance during the movement of the spring, the yield of the spring can be prevented effectively.

Furthermore, when the shoulder portions or stoppers of the respective steps are formed so as to have sloped sidewalls, the adjusting operation can be effected more smoothly in cooperation with the inclination of the projections of the spring.

I claim:

1. A reel-turntable torque adjusting means which comprises:
    a reel-turntable member for conveying a rotational force to a reel turntable;
    said reel-turntable member being formed with a plurality of steps having different heights at an upper peripheral portion thereof;
    a spring member having one or more tip ends pressed against the steps, respectively;
    said spring member having slanting portions on opposite sides of each of said tip ends; and
    a motor-driven friction plate against which said reel-turntable member is pressed by said spring member.

2. A reel-turntable torque adjusting means according to claim 1, wherein each of said steps has a shoulder formed in a slope and a stop defined by slanting sidewalls.

* * * * *